(12) United States Patent
Tsuji

(10) Patent No.: US 7,802,269 B2
(45) Date of Patent: Sep. 21, 2010

(54) ELECTRONIC APPARATUS

(75) Inventor: Hiroyuki Tsuji, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/188,888

(22) Filed: Aug. 8, 2008

(65) Prior Publication Data

US 2009/0113465 A1 Apr. 30, 2009

(30) Foreign Application Priority Data

Oct. 26, 2007 (JP) .............................. 2007-279265

(51) Int. Cl.
*G11B 17/03* (2006.01)
*G06F 1/16* (2006.01)
(52) U.S. Cl. .................................. 720/654; 361/679.33
(58) Field of Classification Search . 361/679.08–679.2, 361/679.33–679.39, 679.26, 679.01, 679.02, 361/724–727; 720/601, 646–647, 652–655, 720/657, 610, 648–649; 312/223.1–223.2; 248/917–924
See application file for complete search history.

(56) References Cited

U.S. PATENT DOCUMENTS

| 2002/0085337 | A1* | 7/2002 | Rubenson et al. ........... 361/680 |
| 2004/0221300 | A1* | 11/2004 | Chen .......................... 720/610 |
| 2004/0223447 | A1 | 11/2004 | Tanaka et al. |
| 2006/0005212 | A1 | 1/2006 | Ichinose et al. |
| 2006/0139876 | A1* | 6/2006 | Eguchi ........................ 361/690 |
| 2006/0168601 | A1* | 7/2006 | Onuma et al. ................ 720/619 |

FOREIGN PATENT DOCUMENTS

| CN | 1811945 | 8/2006 |
| JP | 05-346829 | 12/1993 |
| JP | 2004-22005 | 1/2004 |
| JP | 2004-326499 | 11/2004 |
| JP | 2006-018941 | 1/2006 |

OTHER PUBLICATIONS

Japanese Office Action in a corresponding Japanese application No. 2007-279265 dated Jan. 20, 2009.
Chinese Patent Application No. 200810145694.2, The First Office Action, mailed Mar. 8, 2010 (English translation).

* cited by examiner

*Primary Examiner*—Wayne R Young
*Assistant Examiner*—Nathan A Danielsen
(74) *Attorney, Agent, or Firm*—Blakely, Sokoloff, Taylor & Zafman LLP

(57) ABSTRACT

According to one embodiment, an optical disc drive includes a disc tray, a cover, an advancing/retreating mechanism, a driving unit and an optical head. The cover includes a flat plate portion, an opening portion, wall portions and an opening part. The flat plate portion is opposed to a surface of the disc tray and has a frame shape corresponding to respective side portions of the disc tray. The opening portion is provided in a central part of the flat plate portion. The wall portions erect from outer peripheral parts of the flat plate portion and surround a periphery of the disc tray excluding a front part of the disc tray. The opening part is formed in a manner to open a region opposed to another surface of the disc tray.

4 Claims, 9 Drawing Sheets

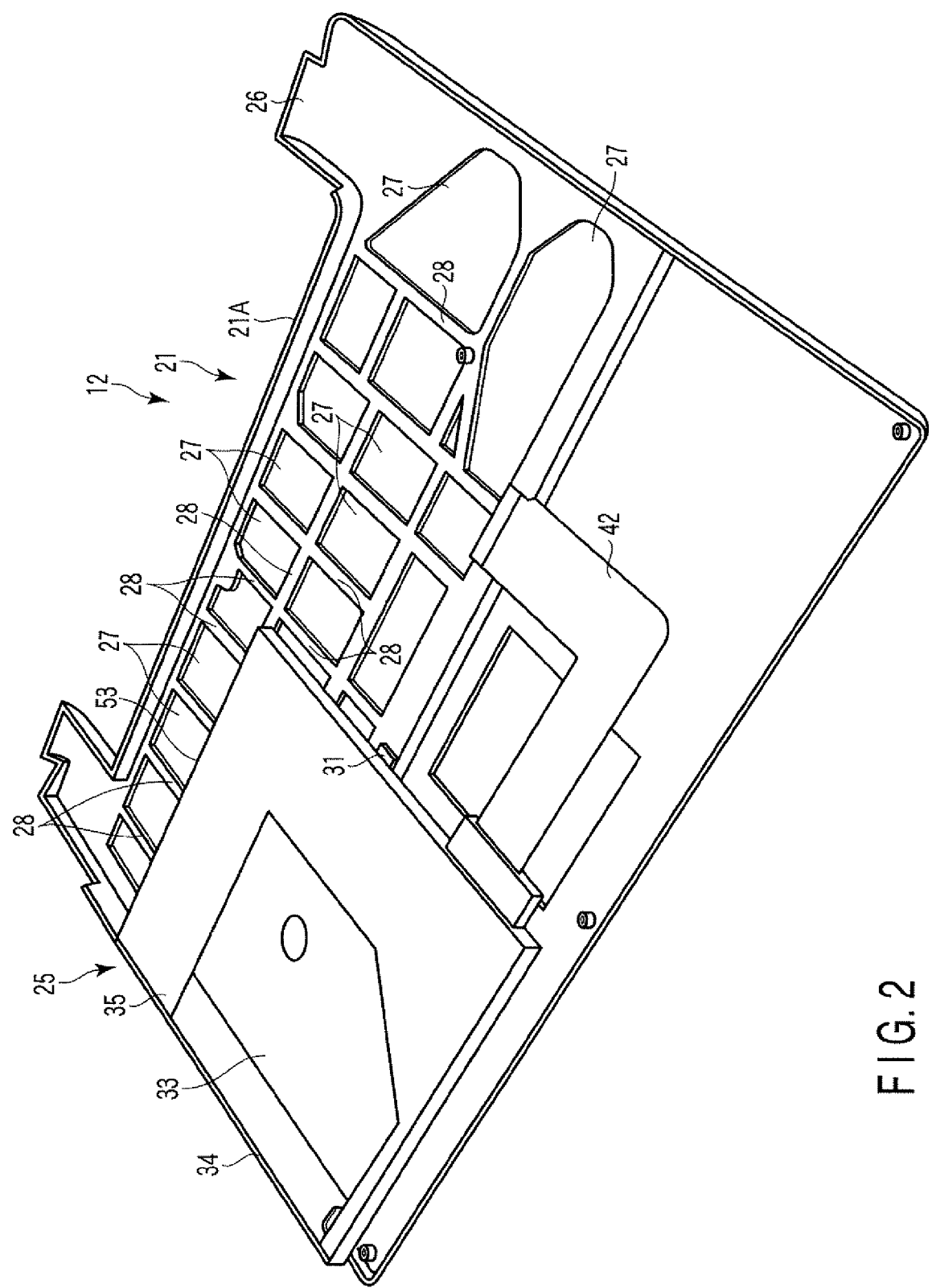
F I G. 2

ELECTRONIC APPARATUS

CROSS-REFERENCE TO RELATED APPLICATIONS

This application is based upon and claims the benefit of priority from Japanese Patent Application No. 2007-279265, filed Oct. 26, 2007, the entire contents of which are incorporated herein by reference.

BACKGROUND

1. Field

One embodiment of the present invention relates to an electronic apparatus including an optical disc drive, which can realize reduction in thickness and weight, and to an optical disc drive.

2. Description of the Related Art

Jpn. Pat. Appln. KOKAI Publication No. 2006-18941, for instance, discloses an optical disc drive which is mounted in a portable computer, the thickness of the optical disc drive being reduced by dispensing with an upper cover and a bottom cover thereof. This optical disc drive includes a C-shaped support frame, a pair of rails which can advance/retreat relative to the support frame, and a disc tray which is disposed between the pair of rails. The support frame has such a shape that a front part thereof is opened, that is, a "C" shape.

The support frame includes a pair of side portions to which the pair of rails are attached, a coupling portion which couples the pair of side portions, and a projection portion which projects inwards from the side portions and the coupling portion. The support frame has an L-shaped cross section over the entire area. The disc tray is loaded/unloaded from an opening part corresponding to the front part of the support frame.

However, if the support frame is formed completely in the C shape, as in the above-described conventional optical disc drive, the side portions are supported in a so-called "cantilever" fashion. Consequently, for example, in a state in which the disc tray is completely drawn out, the support frame may be bent. Therefore, there is a room for improvement of the structure of the support frame.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary perspective view showing a first part of a housing and an optical disc drive shown in FIG. 1;

DETAILED DESCRIPTION

Various embodiments according to the invention will be described hereinafter with reference to the accompanying drawings. In general, according to one embodiment of the invention, an electronic apparatus includes a housing and an optical disc drive accommodated in the housing. The optical disc drive includes a disc tray, a cover, an advancing/retreating mechanism, a driving unit and an optical head. The cover includes a flat plate portion, an opening portion, wall portions and an opening part. The flat plate portion is opposed to a surface of the disc tray and has a frame shape corresponding to respective side portions of the disc tray. The opening portion is provided in a central part of the flat plate portion. The wall portions erect from outer peripheral parts of the flat plate portion and surround a periphery of the disc tray excluding a front part of the disc tray. The opening part is formed in a manner to open a region opposed to another surface of the disc tray.

Figure 1:
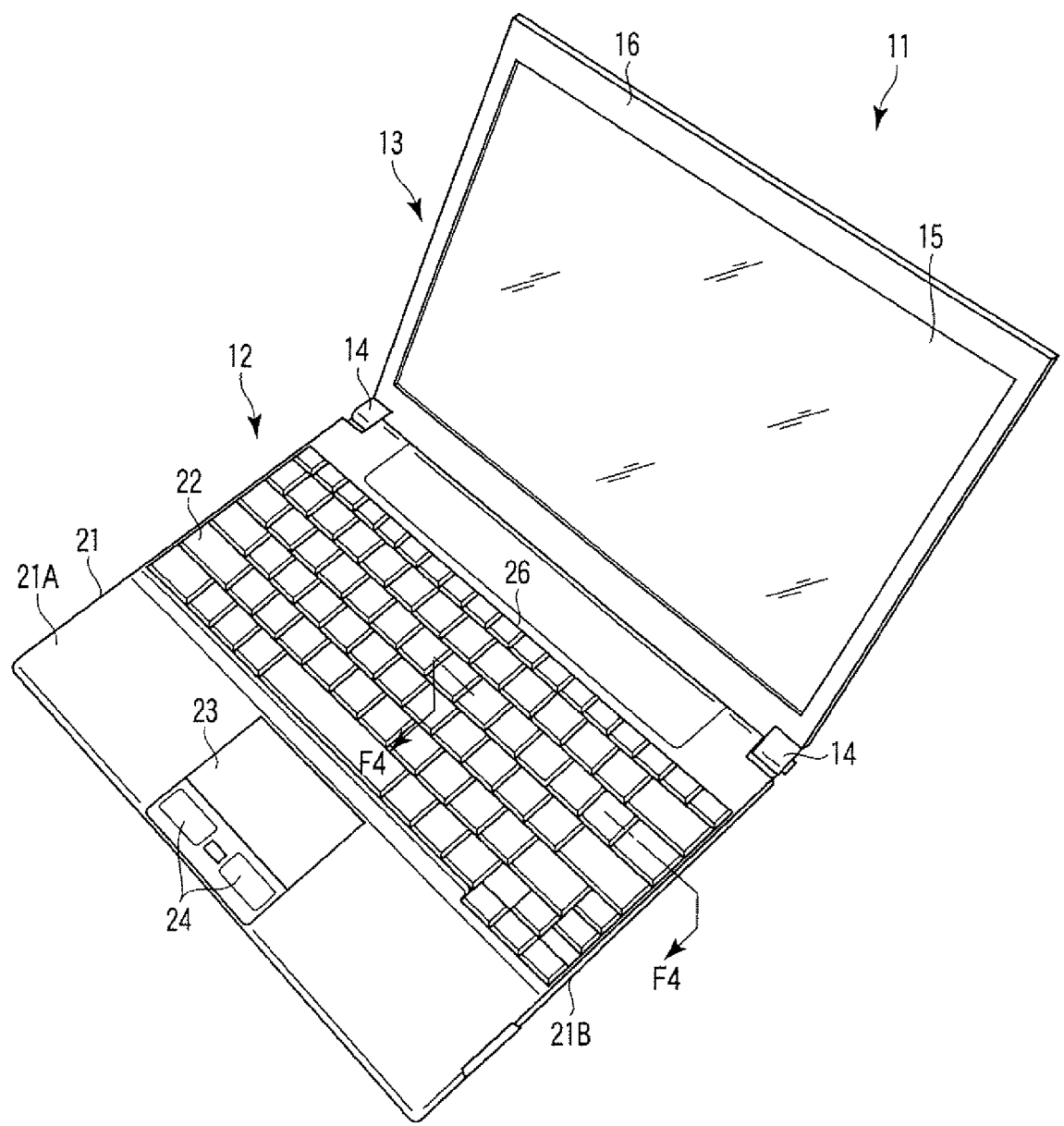
FIG. 1 is an exemplary perspective view showing a portable computer according to an embodiment of the invention.

An embodiment of an electronic apparatus according to the present invention will now be described with reference to FIG. 1 to FIG. 9. As shown in FIG. 1, a portable computer, which is an example of the electronic apparatus, is a so-called notebook-type personal computer.

The portable computer 11 comprises a body unit 12, a display unit 13, and hinge portions 14 which are provided between the body unit 12 and the display unit 13. The hinge portions 14 support the display unit 13 and permit rotation of the display unit 13 relative to the body unit 12. As shown in FIG. 1, the display unit 13 includes a liquid crystal display 15 and a case 16 surrounding the liquid crystal display 15.

The body unit 12 includes a housing 21, a printed circuit board (not shown) which is accommodated in the housing 21, a keyboard 22 which is attached to the housing 21, a touch pad 23 and buttons 24 which constitute a pointing device, and an optical disc drive 25. Although not shown, main circuit components, such as a CPU (central processing unit), are mounted on the printed circuit board.

Figure 3:
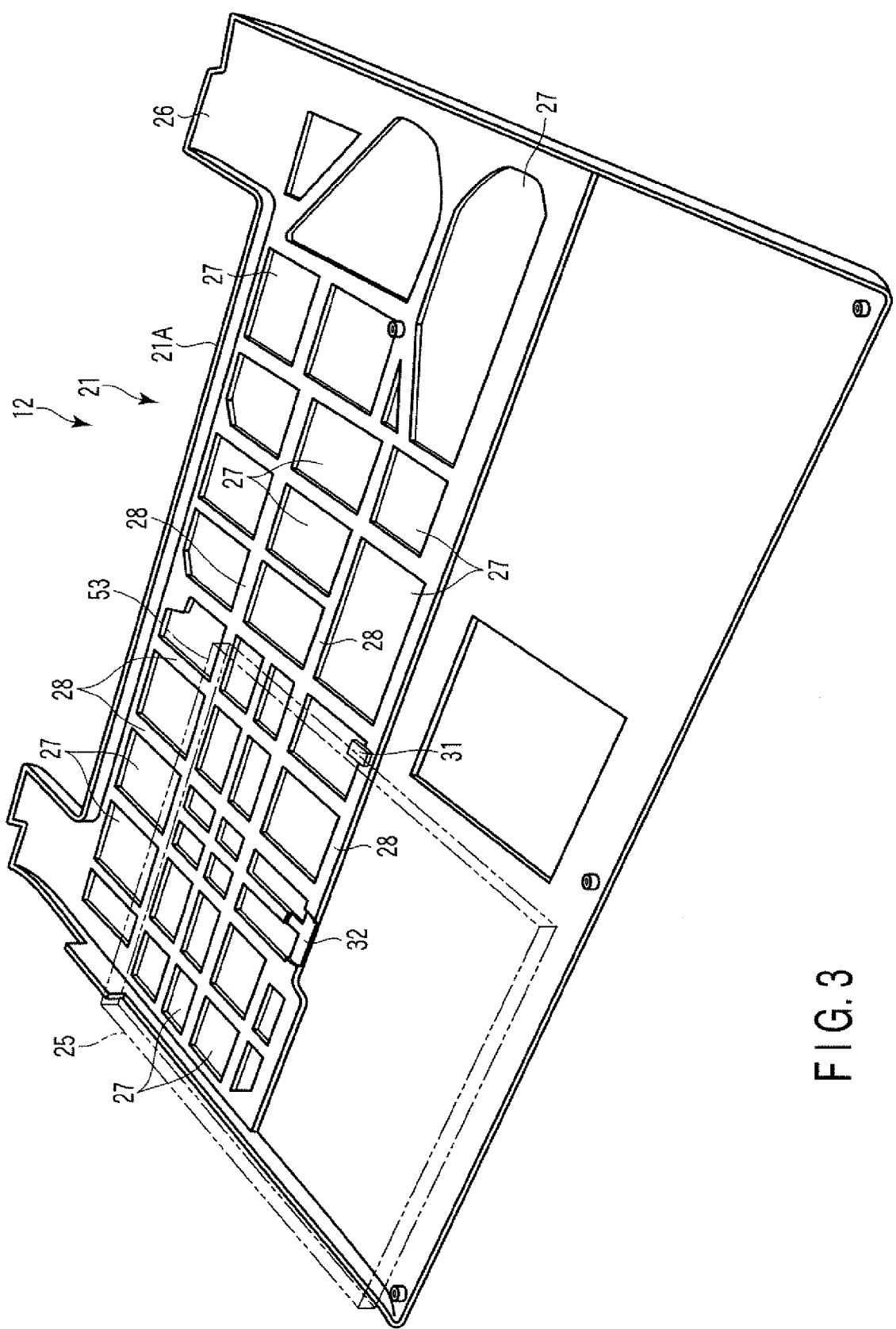
FIG. 3 is an exemplary perspective view showing the first part shown in FIG. 2, with the optical disc drive being removed.
Figure 4:
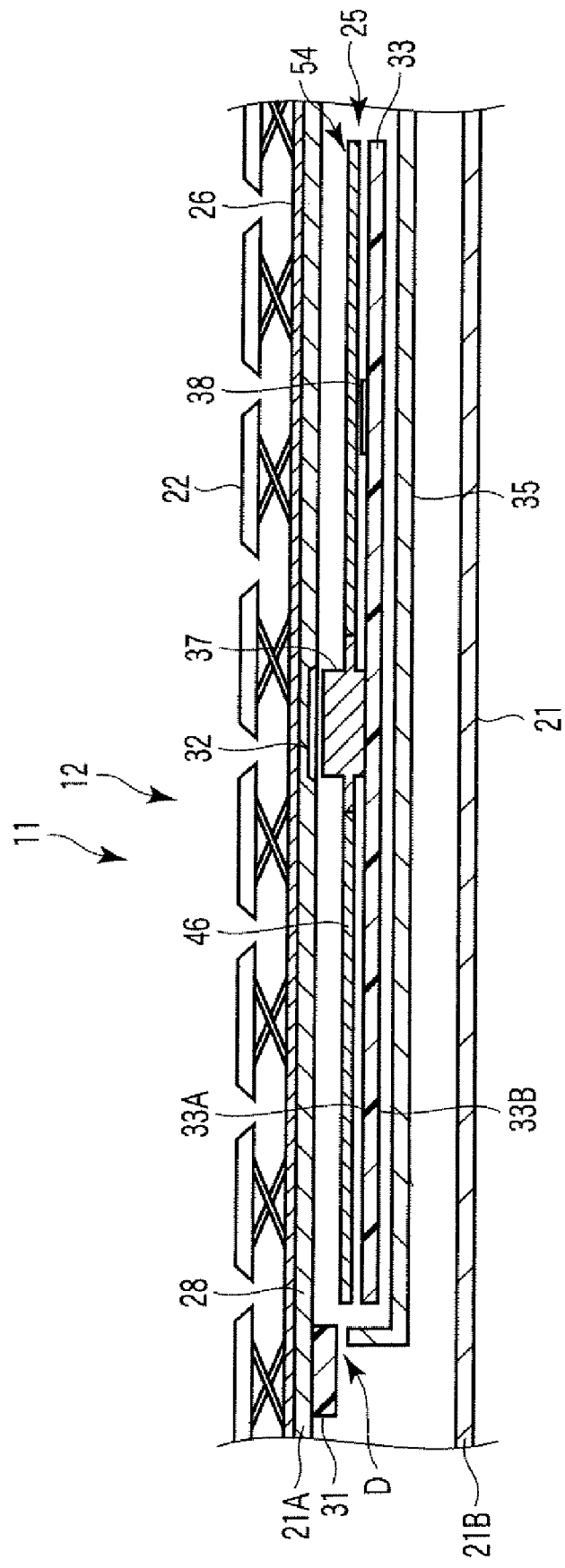
FIG. 4 is an exemplary cross-sectional view of the portable computer shown in FIG. 1, the cross-sectional view being taken along line F4-F4 in FIG. 1.
Figure 5:
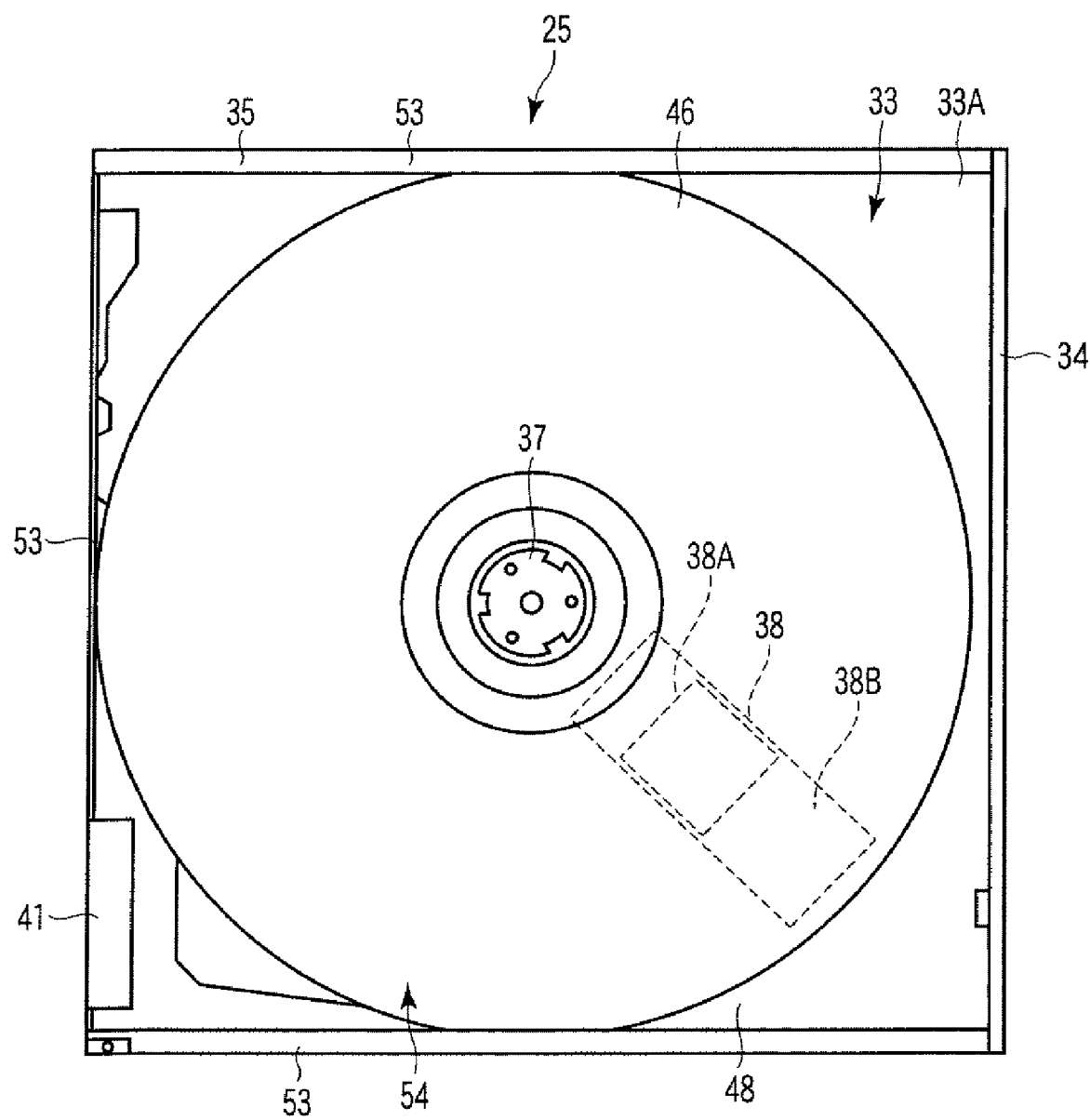
FIG. 5 is an exemplary top view showing, from above, the optical disc drive shown in FIG. 2.
Figure 6:
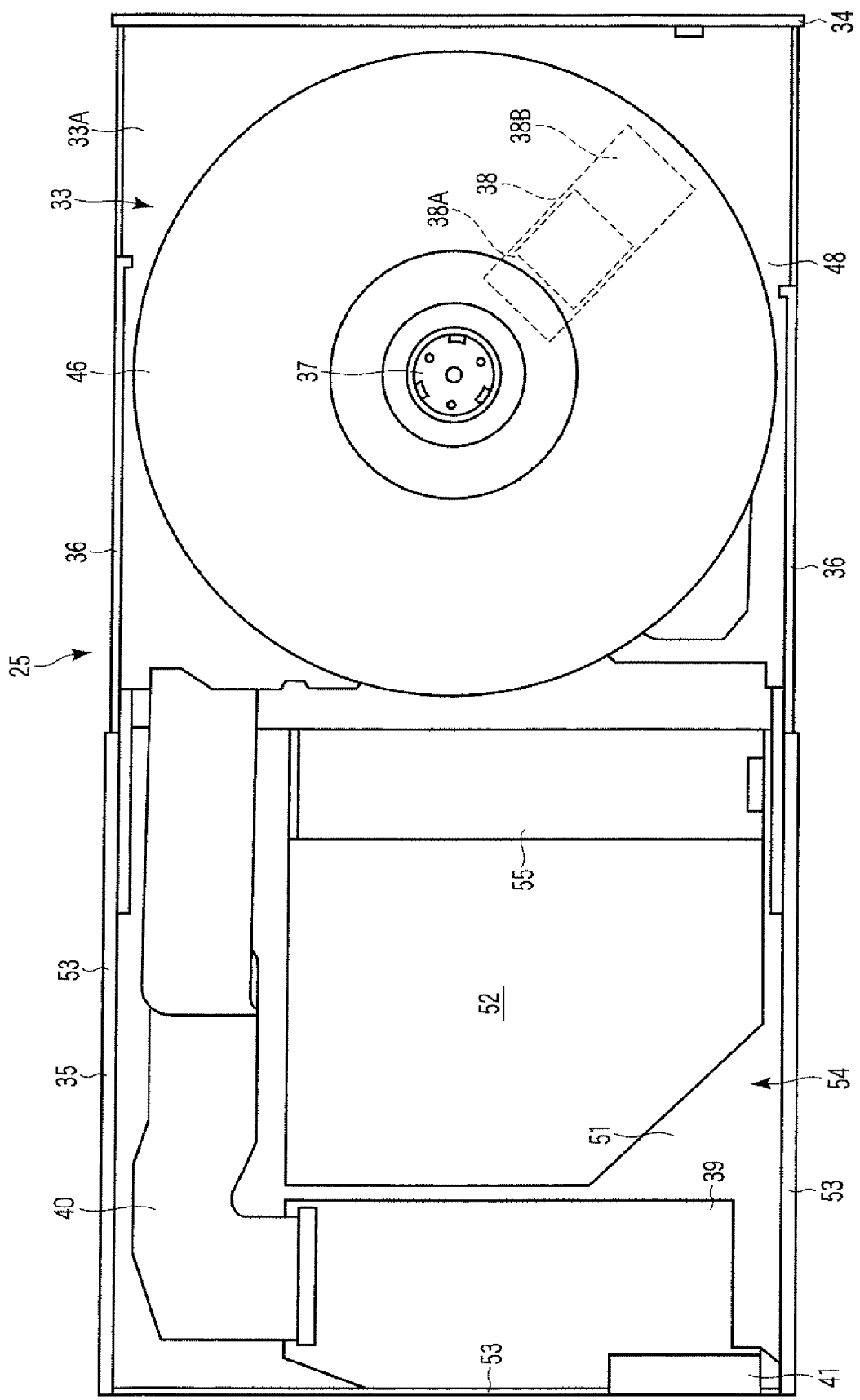
FIG. 6 is an exemplary top view of the optical disc drive shown in FIG. 5 in a state in which a disc tray is drawn out forward.

The housing 21 is formed of, e.g. a magnesium alloy. The housing 21 is divided into two parts in the height direction, namely, an upper-side first part 21A and a lower-side second part 21B. As shown in FIG. 2 and FIG. 3, the first part 21A of the housing 21 includes an attachment portion 26 for attachment of the keyboard 22, a plurality of through-holes 27 which are formed in the attachment portion 26, and frame portions 28 which define peripheries of the through-holes 27. The attachment portion 26 is so formed as to be recessed relative to a peripheral part of the housing 21. The frame portions 28 are formed in a lattice shape. The frame portions 28 correspond to wall portions 53 of a cover 35 of the optical disc drive 25 (to be described later) and are formed to be disposed along the wall walls 53. The plural through-holes 27 are formed, for example, in order to reduce the weight of the housing 21, and are formed inside the frame portions 28. The frame portions 28 have a projection portion 31 which projects toward the optical disc drive 25. The housing 21, when bent, abuts on the wail portion 53 of the cover 35 via the projection portion 31. As shown in FIG. 4, a predetermined gap D is formed between the projection portion 31 and the wall portion 53 of the cover 35.

As shown in FIG. 3, the housing 21 has a circular recess portion 32. The circular recess portion 32 has such a concave shape as to trace the shape of a driving unit 37 of the optical disc drive 25. With the provision of the recess portion 32, interference between the housing 21 and the driving unit 37 is prevented when the housing 21 is bent. Thereby, the optical disc drive 25 can be disposed in a position close to the housing 21, and the thickness of the portable computer 11 can be reduced. A film member (not shown) is disposed so as to cover the plural through-holes 27, thereby ensuring watertightness of the inside of the housing 21. Although the housing 21 is formed of the magnesium alloy, the material of the housing 21 is not limited to the magnesium alloy and the housing 21 may be formed of, for instance, synthetic resin.

As shown in FIG. 5 to FIG. 8, the optical disc drive 25 comprises a rectangular disc tray 33; a bezel 34 which is attached to a front part of the disc tray 33; a cover 35 which covers the disc tray 33; a pair of rails 36 which are an advancing/retreating mechanism provided between the disc tray 33 and the cover 35; a driving unit 37 and an optical head 38 which are provided on one surface of the disc tray 33; a board 39 attached to the cover 35; a flexible wiring board 40 which electrically connects the board 39 and the disc tray 33; a connector 41 provided on the board 39; and a cable 42 which connects the connector 41 and the printed circuit board.

Each of the pair of rails 36 is formed of a metal in a C-shaped cross section. The pair of rails 36 enable forward/backward movement of the disc tray 33 relative to the cover 35. The driving unit 37 is composed of a motor and can rotate and drive an optical disc 46. The optical head 38 includes a head body 38A and a moving mechanism 38B which moves the head body 38A in a radial direction of the optical disc 46. The head body 38A includes a semiconductor laser for a DVD or a semiconductor laser for a CD. The head body 38A can radiate a laser beam on the optical disc 46 and can receive reflective light from the optical disc 46. The head body 38A can execute information write on the optical disc 46 and information read from the optical disc 46.

Figure 7:
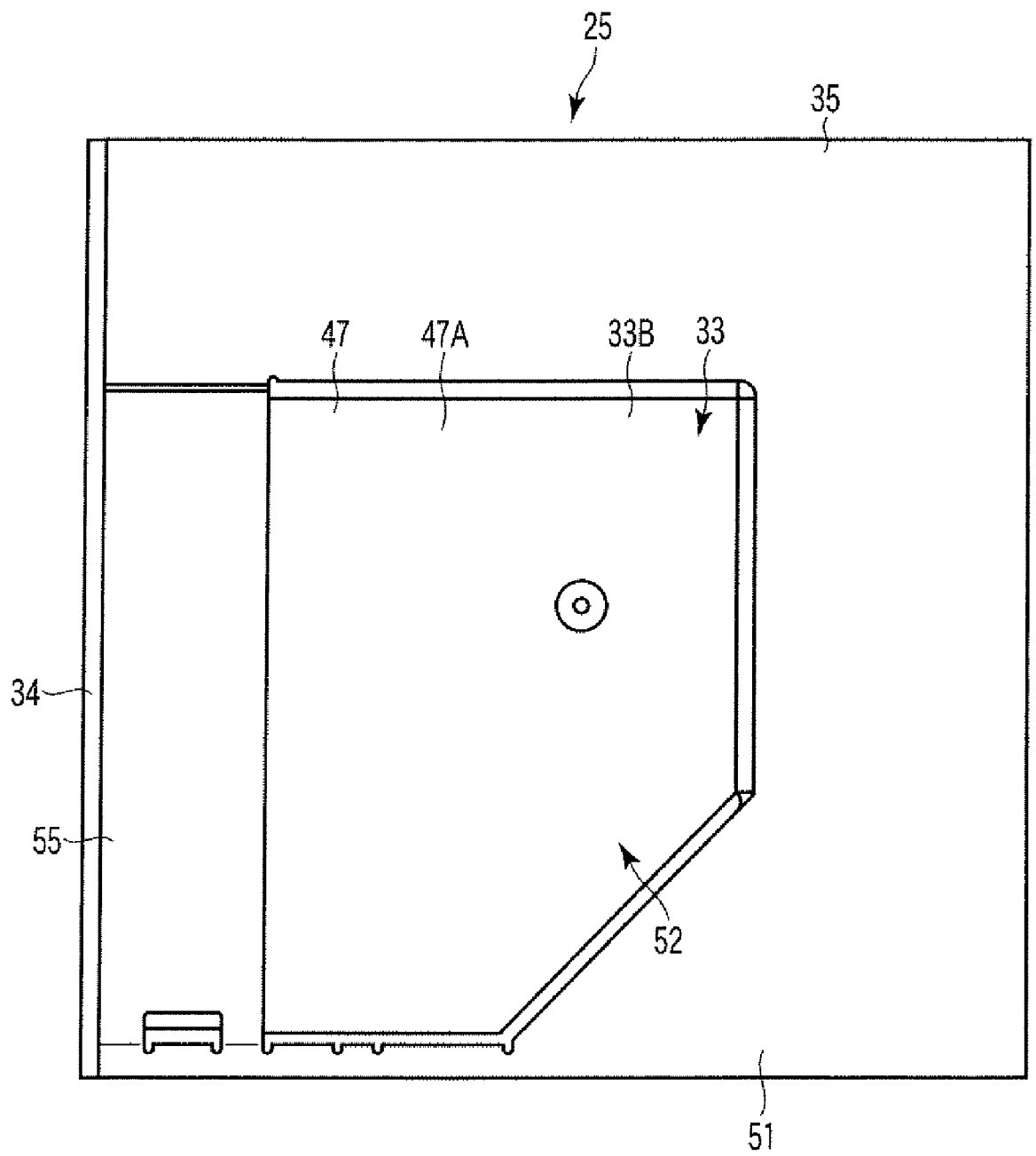
FIG. 7 is an exemplary bottom view showing, from below, the optical disc drive shown in FIG. 5.
Figure 8:
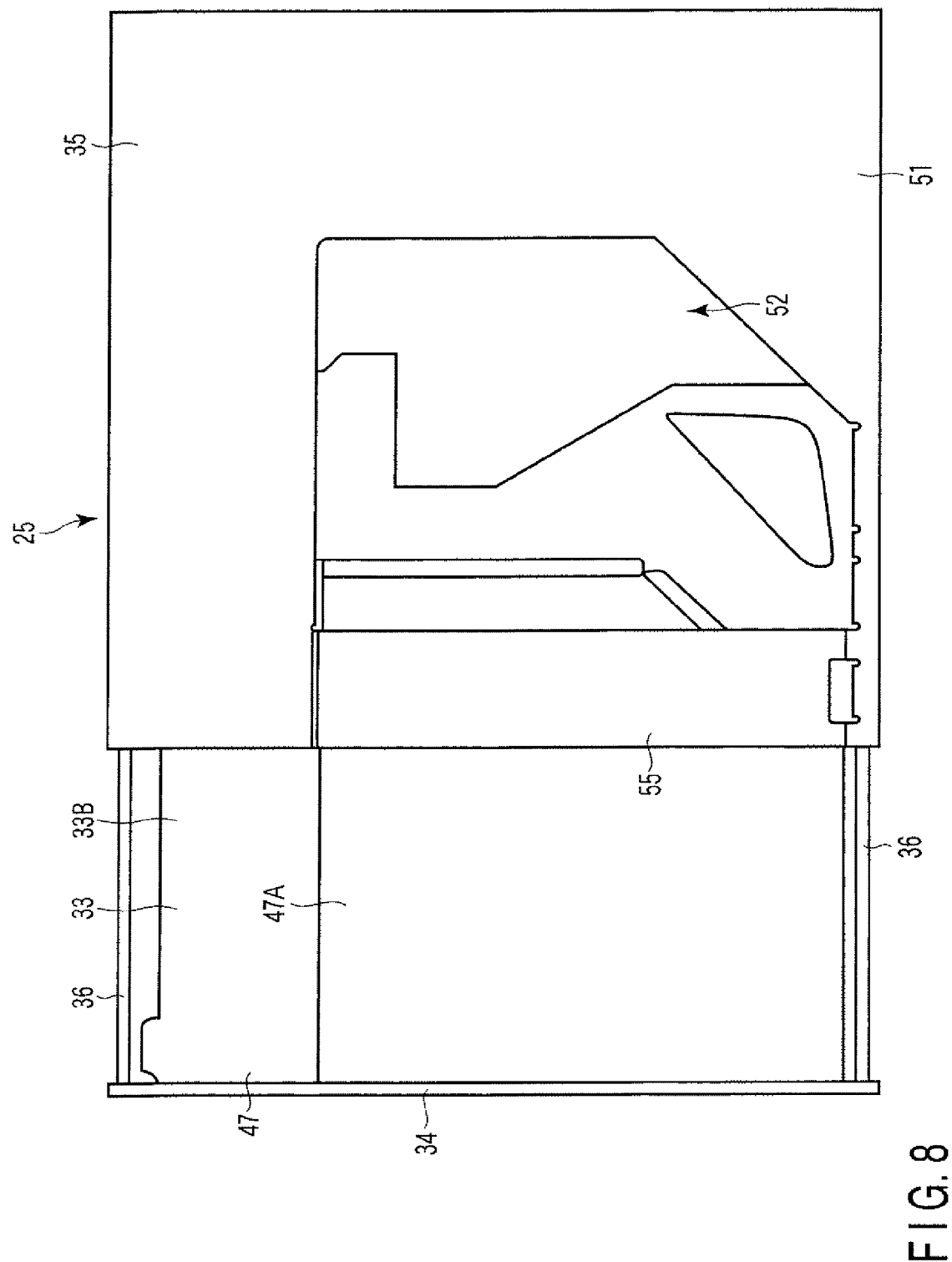
FIG. 8 is an exemplary bottom view showing the optical disc drive shown in FIG. 7 in a state in which the disc tray is drawn out forward.
Figure 9:
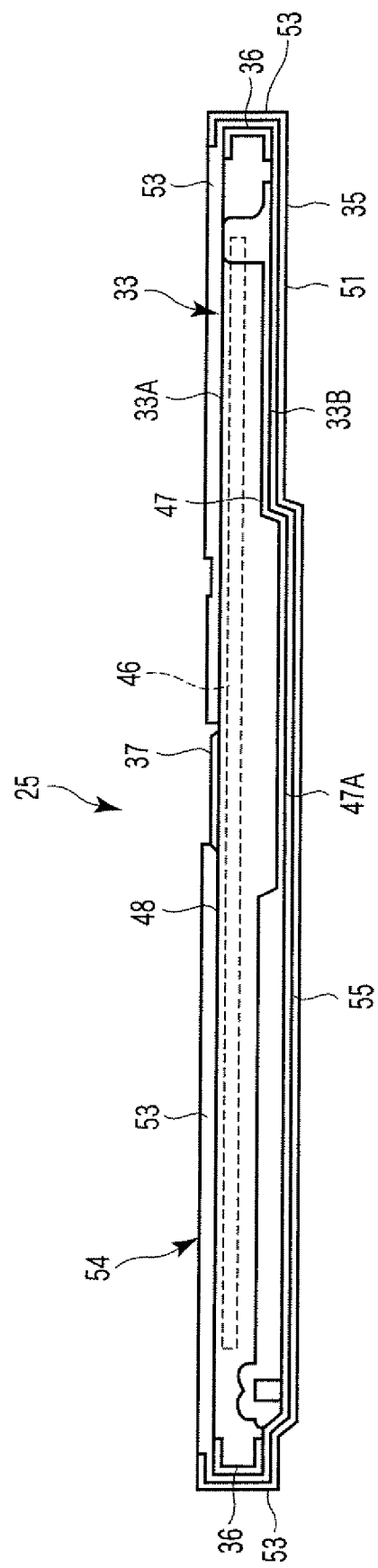
FIG. 9 is an exemplary front view showing, from the front side, the optical disc drive shown in FIG. 5 in a state in which a bezel is removed.

As shown in FIG. 4, the disc tray 33 has one surface 33A on which the optical 46 is mounted, and the other surface 33B which is opposed to the one surface 33A. As shown in FIG. 9, the disc tray 33 includes a metallic frame 47 and a mounting portion 48 which is formed of a synthetic resin and is placed over the frame 47. The optical disc 46 is mounted on the mounting portion 48. As shown in FIG. 7, the disc tray 33 includes a bottom plate portion 47A having a pentagonal shape, and the bottom plate portion 47A is received in an opening portion 52 of the cover 35. The bottom plate portion 47A is formed of a part of the frame 47. As shown in FIG. 9, the level in position of the bottom plate portion 47A is substantially equal to the level in position of a flat plate portion 51. The driving unit 37 and optical head 38 are mounted on the bottom plate portion 47A.

As shown in FIG. 5 to FIG. 8, the cover 35 includes the above-mentioned flat plate portion 51 which is opposed to the other surface 33B of the disc tray 33; the above-mentioned opening portion 52 which is formed in a central area of the flat plate portion 51; the wall portions 53 erecting from the peripheral parts of the flat plate portion 51; and an opening part 54 which is formed so as to open a region opposed to the one surface 33A of the disc tray 33. The wall portions 53 surround the periphery of the disc tray 33 excluding a front part of the disc tray 33, that is, the wall portions 53 surround a rear part and side parts of the disc tray 33. The opening portion 52 is formed in a pentagonal shape which is substantially similar to the shape of the bottom plate portion 47A. The flat plate portion 51 is formed in a frame shape so as to correspond to the respective side parts of the disc tray 33. As shown in FIG. 4, the optical disc drive 25 is disposed such that the opening part 54 is positioned near the inner surface of the housing 21.

The flat plate portion 51 includes a coupling portion 55, and the coupling portion 55 corresponds to the front side part of the disc tray 33. As shown in FIG. 9, the coupling portion 55 is formed to project downward, relative to the other part of the flat plate portion 51. The coupling portion 55 is disposed at a position more away from the optical disc 46 than the bottom plate portion 47A of the disc tray 33. Thus, when the disc tray 33 is advanced/retreated in the forward/backward direction, the coupling portion 55 does not interfere with the disc tray 33.

The optical disc drive 25 further includes an eject button (not shown). When the eject button is pressed, a solenoid and a spring (not shown) are driven, and a part of the disc tray 33 is projected. Thereby, the disc tray 33 is set in a state in which a part of the disc tray 33 projects relative to the cover 35. By hooking the finger on the bezel 34 of the disc tray 33, the user can move the disc tray 33 in the forward/backward direction.

According to the present embodiment, the portable computer 11 includes the housing 21 and the optical disc drive 25 that is accommodated in the housing 21. The optical disc drive 25 comprises the rectangular disc tray 33 having one surface 33A on which the optical disc 46 is mounted; the cover 35 which covers the disc tray 33; the advancing/retreating mechanism which is provided between the disc tray 33 and the cover 35 and advances/retreats the disc tray 33 in the forward/rearward direction relative to the cover 35; the driving unit 37 which is provided on the one surface 33A of the disc tray 33 and rotates the optical disc 46; and the optical head 38 which is provided on one surface 33A of the disc tray 33 and executes at least one of information recording and information reproduction by radiating light on the optical disc 46. The cover 35 includes the flat plate portion 51 which is opposed to the other surface 33B of the disc tray 33 and is formed in a frame shape so as to correspond to the respective side parts of the disc tray 33; the opening portion 52 which is formed in a central area of the flat plate portion 51; the wall portions 53 erecting from the peripheral parts of the flat plate portion 51 and surrounding the periphery of the disc tray 33 excluding the front part of the disc tray 33; and the opening part 54 which is formed so as to open a region opposed to the one surface 33A of the disc tray 33 and is positioned near the housing 21.

According to the above-described structure, that part of the cover 35 covering the disc tray 33 of the optical disc drive 25, which is located between the disc tray 33 and the housing 21, can be dispensed with. Thereby, the weight and thickness of the portable computer 11 can be reduced. In addition, since the opening part 54 is provided near the housing 21, the housing 21 can be made to function also as the cover 35. Thus, even if the region that is opposed to the one surface 33A of the disc tray 33 is opened, there arises no such problem that dust or the like enters from this region.

In this case, the disc tray 33 includes the bottom plate portion 47A, the level in position of which is substantially equal to the level in position of the flat plate portion 51. The bottom plate portion 47A is accommodated in the opening portion 52, and the driving unit 37 and optical head 38 are disposed on the bottom plate portion 47A. The flat plate portion 51 includes the coupling portion 55 which corresponds to the front side part of the disc tray 33, and the coupling portion 55 is disposed at a position more away from the optical disc 46 than the bottom plate portion 47A.

The thickness of that part of the disc tray 33, on which the driving unit 37 and optical head 38 are mounted, tends to increase. According to the above-described structure, however, the driving unit 37 and optical head 38 are disposed on the bottom plate portion 47A, the level in position of which is substantially equal to the level in position of the flat plate portion 51 of the cover 31. Therefore, even if the thickness dimension increases due to the mounting of the driving unit 37 and optical head 38, the increase in thickness can be canceled by the devised positioning of the bottom plate portion 47A. Thereby, the increase in thickness dimension of the optical disc drive 25 can be prevented, and the thickness of the portable computer 11 can be reduced. Furthermore, the coupling portion 55 is disposed at a position more away from the optical disc 46 than the bottom plate portion 47A. Thus, when the disc tray 33 is advanced/retreated in the forward/backward direction, the coupling portion 55 is prevented from interfering with the bottom plate portion 47A.

In this case, the housing 21 includes the attachment portion 26 for attachment of the keyboard 22. The attachment portion 26 includes the frame portions 28 which are formed in a lattice shape and are disposed along the wall portions of the cover 35, and the plural through-holes 27 which are formed inside the frame portions 28.

In the case where the through-holes 27 are formed in the attachment portion 26 of the keyboard 22, the weight of the housing 21 can be reduced, but the attachment 26 tends to be easily bent. According to the above-described structure, however, the frame portions 28 are disposed along the wall portions 53 of the cover 35. Thus, when the keyboard 22 is pressed by the user and the attachment portion 26 tries to bend, the frame portions 28 can be received by the wall portions 53 of the optical disc drive 25. Therefore, the weight of the housing 21 can be reduced, and a decrease in strength of the housing 21 can be prevented.

In this case, the housing 21 includes the recess portion 32 which has such a concave shape as to trace the shape of the driving unit 37. According to this structure, the optical disc drive 25 can be disposed near the housing 21. Thereby, contact between the driving unit 37 and the housing 21 can be prevented, and the thickness of the portable computer 11 can be reduced.

The electronic apparatus of the present invention is not limited to the portable computer 11, and the invention is applicable to other electronic apparatuses such as portable information terminals. Furthermore, the invention can variously be modified in practice, without departing from the spirit of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing; and
   an optical disc drive accommodated in the housing, the optical disc drive including:
      a rectangular disc tray having one surface on which an optical disc is mounted,
      a cover which covers the disc tray,
      an advancing/retreating mechanism which is provided between the disc tray and the cover and advances/retreats the disc tray relative to the cover in a forward/backward direction,
      a driving unit which is provided on the one surface of the disc tray and rotates the optical disc, and
      an optical head which is provided on the one surface of the disc tray and executes at least one of information recording and information reproduction by radiating light on the optical disc, and
   the cover including:
      a flat plate portion which is opposed to the other surface of the disc tray and has a frame shape corresponding to respective side portions of the disc tray,
      an opening portion provided in a central part of the flat plate portion,
      wall portions erecting from outer peripheral parts of the flat plate portion and surrounding a periphery of the disc tray excluding a front part of the disc tray, and
      an opening part which is formed in a manner to open a region opposed to the one surface of the disc tray, and is positioned near the housing,
   wherein the housing includes an attachment portion for attachment of a keyboard, and the attachment portion including:
      frame portions which are formed in a lattice shape and are disposed along the wall portions of the cover, and
      a plurality of through-holes which are formed inside the frame portions.

2. The electronic apparatus according to claim 1, wherein the disc tray includes a bottom plate portion having a level in position which is substantially equal to a level in position of the flat plate portion, the bottom plate portion being accommodated in the opening portion, and the driving unit and the optical head being mounted on the bottom plate portion,
   the flat plate portion includes a flat-shaped coupling portion corresponding to a front side portion of the disc tray, and
   the coupling portion is disposed at a position more away from the optical disc than the bottom plate portion.

3. The electronic apparatus according to claim 2, wherein the housing includes a recess portion which is formed to have such a concave shape as to trace a shape of the driving unit.

4. An electronic apparatus comprising:
   a housing; and
   an optical disc drive accommodated in the housing, the optical disc drive including:
      a rectangular disc tray having one surface on which an optical disc is mounted, and
      a cover which covers the disc tray, the cover including:
         a flat plate portion which is opposed to the other surface of the disc tray and has a frame shape corresponding to respective side portions of the disc tray,
         an opening portion provided in a central part of the flat plate portion,
         wall portions erecting from outer peripheral parts of the flat plate portion and surrounding a periphery of the disc tray excluding a front part of the disc tray, and an opening part which is formed in a manner to open a region opposed to the one surface of the disc tray, and is positioned near the housing, wherein the housing including an attachment portion for attachment of a keyboard, the attachment portion including:

frame portions which are formed in a lattice shape and are disposed along the wall portions of the cover, and a plurality of through-holes which are formed inside the frame portions.

* * * * *